Figure 1:
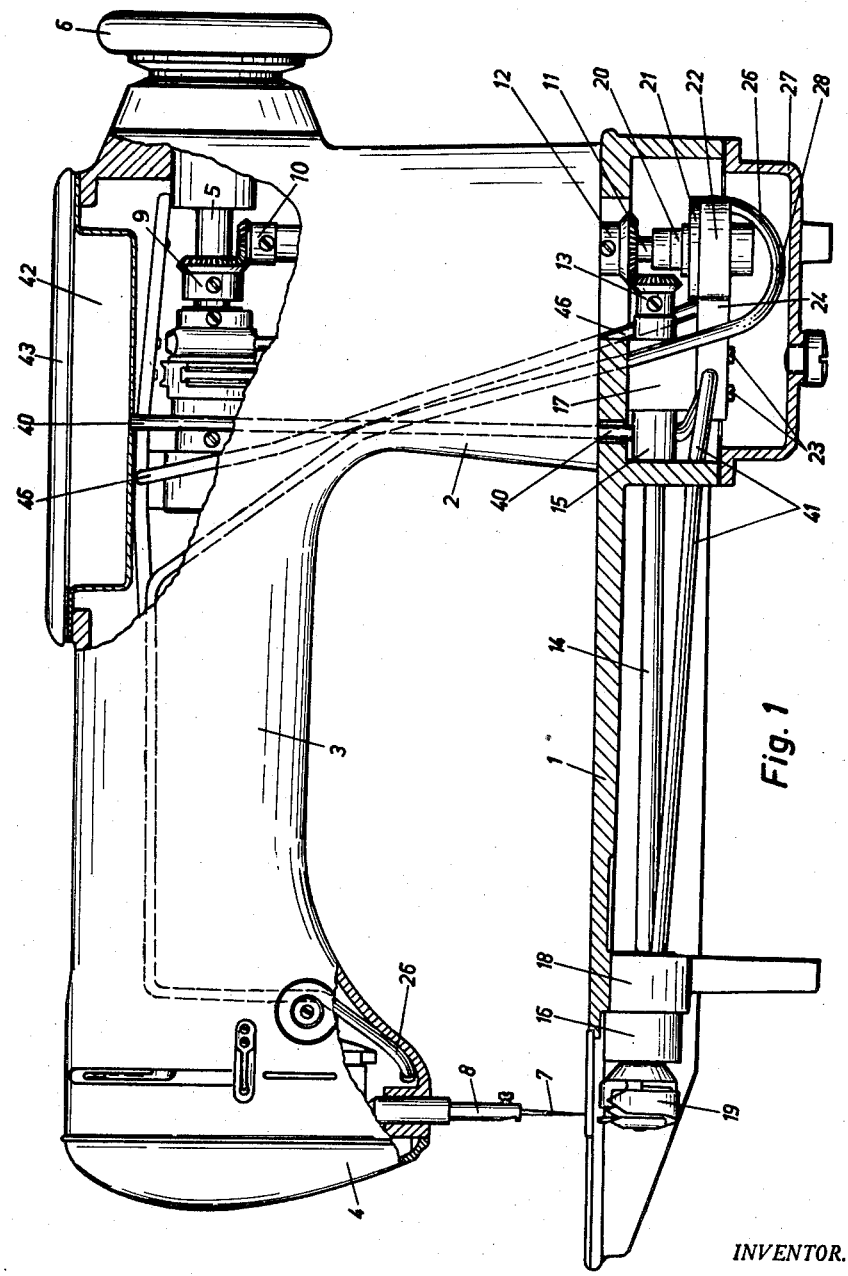

June 7, 1960     E. WRASE     2,939,415
LOOP TAKER LUBRICATION FOR SEWING AND THE LIKE MACHINES
Filed Dec. 27, 1956     2 Sheets-Sheet 1

INVENTOR.
ERICH WRASE
BY
ATTORNEY

June 7, 1960  E. WRASE  2,939,415
LOOP TAKER LUBRICATION FOR SEWING AND THE LIKE MACHINES
Filed Dec. 27, 1956  2 Sheets-Sheet 2

INVENTOR.
ERICH WRASE
BY
ATTORNEY

United States Patent Office 2,939,415
Patented June 7, 1960

2,939,415

LOOP TAKER LUBRICATION FOR SEWING AND THE LIKE MACHINES

Erich Wrase, Kaiserslautern, Pfalz, Germany, assignor to G. M. Pfaff A.G., Kaiserslautern, Pfalz, Germany, a corporation of Germany Filed Dec. 27, 1956, Ser. No. 630,796

Claims priority, application Germany Dec. 28, 1955

4 Claims. (Cl. 112—256)

The present invention relates to the lubrication of sewing and the like machines, more particularly to an improved system for lubricating the bearing surfaces of the loop taker raceways of machines of this type.

In the lubrication of sewing machines, special care must be given to the lubrication of the loop taker raceways to supply the exact amount of lubricant required depending upon the operating conditions to insure an adequate and efficient lubrication, on the one hand, and to prevent a surplus supply of lubricant liable to cause flooding of the loop taker and consequent staining or soiling of the thread, as well as other drawbacks and defects, not to mention the wastage of lubricant involved.

In order to achieve these aims and results, arrangements for loop taker lubrication have already become known which comprise a lubricant container or reservoir mounted at a point higher than the loop taker to be lubricated and from which the oil or lubricant is fed by the action of gravity to the bearing surfaces of the loop taker raceways through a lubricant conducting line or conduit. While lubricating systems of this type are superior to other systems in insuring a constant flow of lubricant, they still possess a number of shortcomings and drawbacks which have slowed or prevented their general practical use and acceptance in the past.

Thus, with known gravity type lubricating systems, a flooding of the loop taker is liable to occur upon temporarily stopping or during the inoperative or non-use condition of the sewing machine. This difficulty could not be overcome by the provision of a throttle or control valve in the lubricant supply line. For this reason, it has further been proposed to provide a stop valve in the lubricant reservoir by means of which the supply of lubricant could be interrupted when the machine was stopped or not in operation. Since this stop valve had to be controlled manually, it required a separate operation which could be easily forgotten or overlooked by the operator. In order to avoid the latter possibility, it has further been proposed to provide an overflow device near the inlet opening or entrance to the bore in the loop taker shaft through which the lubricant is fed to the raceways or bearing surfaces to be lubricated. Such an overflow device, while greatly wasteful of lubricant, can be used only in connection with loop takers mounted for operation upon a vertical drive shaft. Furthermore, if the machine is idle during longer periods, the lubricant reservoir may be completely emptied, thus rendering the use of a system of this type impracticable, if not prohibitive, from a practical and economical standpoint.

Finally, known gravity type lubricating devices, while satisfactory for a given operating speed of the machine, operate less efficiently and are still liable to cause flooding and other defects if the operating speed varies within substantial limits.

According to still another solution proposed in the past to overcome some of the drawbacks of existing gravity type loop taker lubricating devices, a spring-biased valve mounted upon the lubricant reservoir is briefly opened and closed upon clamping and release of the work or sewing material by the provision of suitable operating means such as a connecting link or the like between said valve and the work clamping device, such as the presser foot of the machine. Devices of this type, are however, devoid of any relation between the amount of lubricant supplied and varying operating conditions of the machine, in particular a varying operating speed, the number of stitches, or the length of intermittent sewing cycles, etc.

Accordingly, an important object of the present invention is to substantially overcome the above and related drawbacks and difficulties inherent in the prior gravity type loop taker lubricating devices for sewing and the like machines.

Another object of the invention is the provision of a loop taker lubrication device of this type by which the amount of lubricant fed to the loop taker bearing surfaces is automatically regulated to conform with the existing requirements, such as operating speed, length of sewing cycles, etc.

Still another object of the invention is to provide a loop taker lubricating device which substantially eliminates flooding of the loop taker; which insures the exact amount of lubricant supply required under varying operating conditions; which substantially avoids wastage of lubricant; which is both efficient and economical in operation as well as simple in construction; which insures positive and reliable lubrication under all circumstances and operating conditions; and which can be readily embodied in conventional sewing machine structures.

Figure 2:
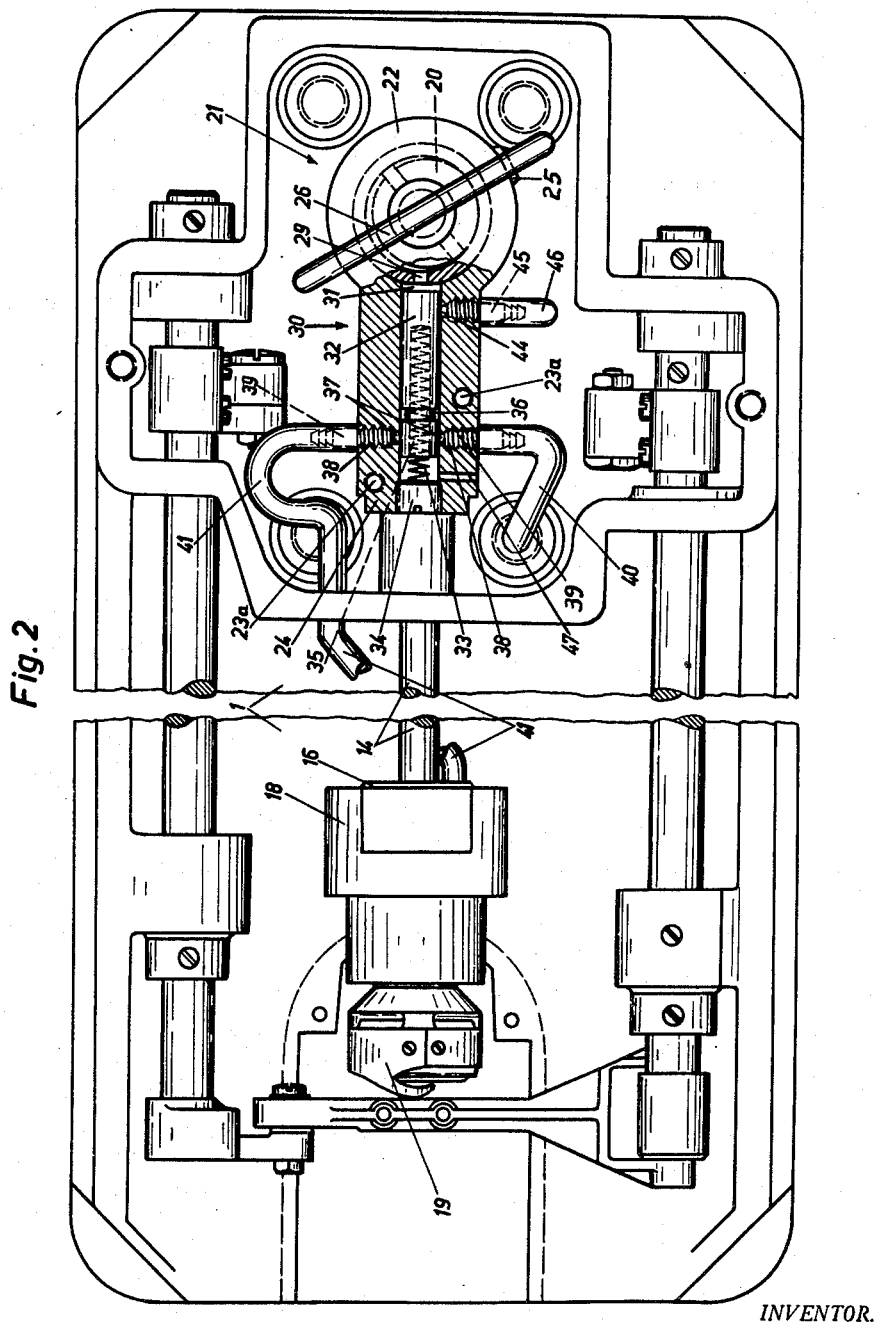

The foregoing, as well as ancillary objects and novel aspects of the invention, will be better understood from the following detailed description of a practical embodiment taken in reference of the accompanying drawing, forming part of this specification and wherein:

Fig. 1 is an elevational view, shown partly in section, of a sewing machine embodying loop taker lubricating means constructed in accordance with the principles of the invention; and Fig. 2 is a bottom view, shown on an enlarged scale, of Fig. 1, with the lower lubricant reservoir omitted and with the lubricant control device according to the invention shown in section.

With the foregoing objects in view, the invention involves generally the provision of a regulating or control device in the lubricant conducting line or conduit connecting the loop taker of a sewing machine with a lubricant reservoir mounted at a relatively higher point, to effect a continuous flow of lubricant by the action of gravity. The regulating device, such as a piston valve or the like, is in turn controlled in response to the operating conditions of the machine, in particular the operating speed, in such a manner as to regulate the flow of lubricant depending upon the speed of the machine, whereby to interrupt the lubricant supply in the rest or non-use condition of the machine and to vary the flow of lubricant in proportion to and within a predetermined range of operating speed of the machine.

As a result, the lubricant flow is constantly adapted to the lubrication requirements, whereby to avoid any lubricant surplus and to prevent flooding of the loop taker, wastage of lubricant and other drawbacks and defects as mentioned hereinabove.

According to one embodiment, the lubricant regulator in the lubricant conducting line or conduit may be operated or controlled by a centrifugal device driven by an operative part of the machine, such as the main drive or arm shaft, and serving to produce a centrifugal pressure applied to the adjustable member of a spring-biased control valve or the like of any suitable construction, the design and operation of the valve being such as to normally interrupt the lubricant flow and to open the valve by varying extents by the centrifugal pressure in proportion to the operating speed of the sewing or the like machine.

Alternatively, the lubricant regulator or control valve may be operated hydraulically by liquid or fluid pressure produced in a cylinder by means of a piston under the control of centrifugal force, in a manner well known and understood from the following.

According to a preferred embodiment of the invention, the lubricant regulating device is controlled by the output pressure of a separate lubricant pump of the machine provided for lubricating moving parts or bearing surfaces of the machine other than those of the loop taker, such as the arm shaft bearings, the needle and work feed mechanisms, etc. Such a control device in a simplified construction, may be combined with the oil or lubricant pump, in a manner shown by the drawing and described hereinafter.

Referring more particularly to the drawing, wherein like reference numerals denote like parts in both views thereof, the numeral 1 represents the bed plate, 2 is the upright and 3 the upper arm of a conventional sewing machine, said arm terminating in a needle head 4. Mounted within the arm 3 is an arm shaft 5 to one end of which is secured a hand wheel 6 and whose opposite end is operatively connected to a reciprocating needle bar 8 carrying the needle 7. Further secured to the arm shaft 5 near the hand wheel 6 is a bevel gear 9 which meshes with a bevel gear 10 mounted upon the upper end of vertical shaft 11. Mounted near the lower end of the vertical shaft 11 is a further bevel gear 12 which meshes with a bevel gear 13 secured to the rear end of the loop taker drive shaft 14. The latter is journalled in bearings 15 and 16 which are secured to depending extensions or brackets 17 and 18 secured to or integral with the base plate or bed 1. Mounted upon the front end of the loop taker drive shaft 14 is the loop taker 19 which cooperates with the needle 7 in the stitch formation in a manner well known. Other details not forming part of or being unnecessary for the understanding of the invention are omitted from the drawing for the sake of clarity and in an effort to simplify the disclosure.

Further secured to the lower end of the vertical shaft 11 is the rotary part 20 of an oil pump 21 which may be a centrifugal pump, gear pump, vane pump, or the like, the pump casing or housing 22, in the example shown, being secured to the extension 17 of the base 1 by means of screws 23. For this purpose, the pump housing 22 is provided with an extension 24 forming a casing of the valve mechanism according to the invention and being provided with mounting holes 23a. Secured to the input side of the pump casing 22 is a suction tube 25 to which is connected a suction line or conduit 26 which extends to a lubricant reservoir (not shown) provided in the head 4 of the machine. Conduit 26 is so shaped and arranged as to be at least partly immersed in a further oil reservoir 27 secured to the base 1 below the upright 2. The lowest point of the conduit 26 in the reservoir 27 is provided with a port or opening 28, whereby the pump is supplied with oil even if the reservoir in the head 4 should be empty or exhausted.

The oil pump 21, shown in Fig. 2 on an enlarged scale, has an output or pressure side whose outlet opening 29 is arranged symmetrically to the extension 24 forming the housing of the lubricant regulator collectively indicated at 30 in drawing. For this purpose, the extension 24 has a cylindrical bore 31 of increased diameter compared with the outlet 29 and wherein is displaceably mounted a piston 32. The piston 32 is biased by a spring 33 having one end engaging a plug 34 screwed or otherwise secured in the outer end of the bore 31 and having its opposite end engaging the inside of a longitudinal bore 35 in the piston 32. The spring 33 normally tends to urge the piston in a direction towards the outlet 29 of the pump 21, whereby the valve assumes a normal position as shown in the drawing.

The piston 32 is provided with an annular groove 36 which in the extreme left position of the piston registers with a pair of radial bores 37 provided in the extension or cylinder 24 on opposite sides of the bore 31. The bores 37 are provided with internal threads 38 to receive a pair of contact nipples 39 connecting the bores 37 with a pair of lines or conduits 40 and 41, respectively. Line 40 connects through the upright 2 with an oil reservoir 42 provided in the arm 3 and having a cover 43, Fig. 1, and the line 41 connects with the bearing 16 of the loop taker drive shaft 14 through which the loop taker bearing surfaces are supplied with lubricant in a manner well known.

The extension 24 of the pump 21 is provided with a further radial bore 44 arranged adjacent to the pump outlet 29 and being connected through a nipple 45 to a pressure line 46 which in a known manner serves to lubricate other moving parts or bearings, such as those disposed in the head 4, the arm 3, and the upright 2 of the machine. In order to equalize the atmospheric pressure in the cylinder 24, the latter is provided with a further radial bore 47 arranged on the side of the piston 32 opposite to the outlet 29.

The operation of the lubricating device is further described in the following.

In the non-operative or rest position of the machine, the pump 21 does not operate and accordingly produces no oil pressure. As a result, the bias-spring 33 urges the piston 32 into the position shown in Fig. 2 of the drawing. In this position, the flow of the lubricant from the reservoir 42 through to loop taker 19 through lines 40 and 41 is blocked or interrupted, whereby flooding of the loop taker 19 is prevented, when the machine is temporarily stopped and not in use.

If the machine is now started the pump 21 also starts to operate, whereby oil is sucked from the reservoir in the head 4 or the reservoir 27, respectively, thus increasing the oil pressure in the bore 31 of the cylinder 24 and displacing the piston 32 towards the left until the groove 36 coincides with the bore 37. As a result, oil will start to flow by the action of gravity from the reservoir 42 to the loop taker through the lines 40 and 41 and the valve 30. At the same time oil is pressed into line 46, resulting in lubrication of the remaining parts of the machine.

By the proper relative design and construction of the groove 36 in the piston 32, the diameter of the bores 38 and of the spring 33, the amount of lubricant flowing through the valve 30 varies depending upon or in proportion to the pressure produced by the pump 21, that is, in turn the operating speed of the sewing machine. In other words, the design and adjustment of the valve 30 is such as to cause a varying overlap or register of the groove 36 with the openings provided by the bores 38, whereby to result in an effective cross-section of the lubricant passage through the valve varying in proportion to and within a predetermined range of operating speed of the machine. More specifically, as the speed increases from zero, the lubricant flow through the valve is initiated as the speed reaches a predetermined lower limit when the groove 36 initially registers with the bore openings 38, whereupon the groove registers with increasing cross-sectional areas of the bore openings, such as to increase the lubricant flow as the speed is further increased. This in turn, insures optimum lubrication under all operating speeds with a minimum of lubricant and without the drawbacks of previous lubricating devices of this character.

The lubricant regulator 30 may be controlled mechanically through a centrifugal governor or the like arranged to directly apply a centrifugal pressure to the piston 32.

As this pressure varies with the operating speed of the machine, it causes the valve to be opened and closed and to control the lubricant flow in substantially the same manner as described and understood from the above, provided a proper design of the spring 38 and relative dimensions of the groove 36 and cross-section of the bores 38. In such a case, the regulator may be mounted at any other suitable point of the machine or the fluid pressure from the pump 21 or a separate hydraulic centrifugal device may be transmitted to the valve through a separate pressure line or conduit. The lubricant passing through the valve 31 may be applied to the loop taker bearing surfaces in any suitable manner, such as by way of a longitudinal bore through the loop taker drive shaft 14, or in any other manner known in the art. Although a rotary loop taker has been shown for illustration, it will be understood that the advantages of the invention apply equally to other loop taker constructions known in the art.

In general, the control means or lubricant regulator inserted in the feed line or duct connecting the lubricant reservoir with the loop taker may be of any suitable type having a movable element adapted to regulate the lubricant flow and actuating means responsive to the operating speed of the machine to vary the amount of lubricant passed, in such a manner as to normally, that is when the machine is at rest, stop or block the lubricant supply and to cause a varying lubricant flow in proportion to and within a predetermined range of operating speed of the machine. The construction and adjustment of the regulator is furthermore such as to effect just the necessary lubricant supply under all conditions, whereby to eliminate the danger of flooding of the loop taker, wastage of lubricant and other defects and drawbacks inherent in prior lubricant lubrication systems of this type.

In the foregoing, the invention has been described with reference to a specific illustrative device. It will be evident, however, that variations and modifications, as well as the substitution of equivalent elements for those shown for illustration, may be made without departing from the scope and broader spirit of the invention as set forth in the appended claims. The specification and drawings are accordingly to be regarded in an illustrative rather than in a limiting sense.

I claim:

1. In combination with a sewing and the like machine being subject to substantial variations of its operating speed and having stitch forming means comprising a reciprocating needle and a loop taker cooperating therewith, lubricating means for said loop taker comprising a lubricant reservoir located at a point higher than said loop taker, a lubricant conducting line connecting said reservoir with said loop taker to cause lubricant to be fed thereto, control valve means inserted in said line having an adjustable element to regulate the flow of lubricant, and liquid pressure means controlling said element responsive to the operating speed of said machine, to normally block the lubricant supply and to cause a varying lubricant flow through said line in proportion to and within a predetermined range of the operating speed of said machine.

2. In a loop taker lubricating system as claimed in claim 1 wherein said last-mentioned means is comprised of a lubricant pump driven by said machine to lubricate parts of said machine other than said loop taker, and means to control said element by the output pressure of said pump.

3. In combination with a sewing and the like machine being subject to substantial variations of its operating speed and having stitch forming means comprising a reciprocating needle and a loop taker cooperating therewith, lubricating means for said loop taker comprising a lubricant reservoir located at a point higher than said loop taker, a lubricant conducting line connecting said reservoir with said loop taker to cause lubricant to be fed thereto, a control valve having a cylinder provided with a pair of radial bores inserted in said line, a spring-biased piston movable within said cylinder and having a circumferential groove adapted to variably register with said bores, to control the lubricant flow through said line, and means to displace said piston by pressure varying in proportion to the operating speed of said machine, to normally block the lubricant supply and to cause a varying lubricant flow through said line in proportion to and within a predetermined range of the operating speed of said machine.

4. In combination with a sewing and the like machine being subject to substantial variations of its operating speed and having stitch forming means comprising a reciprocating needle and a loop taker cooperating therewith, lubrication control means for said loop taker comprising a lubricant reservoir located at a point above said loop taker, a lubricant conducting line connecting said reservoir with said loop taker, to cause lubricant to be fed thereto, a control valve inserted in said line having an adjustable element, to regulate the flow of lubricant, and means to produce a varying actuating force for said element responsive to the operating speed of said machine, to open and close said valve in direct proportion to increasing and decreasing operating speed, respectively.

References Cited in the file of this patent

UNITED STATES PATENTS

| | | |
|---|---|---|
| 1,234,361 | McVoy | July 24, 1917 |
| 1,311,817 | Hohmann | July 29, 1919 |
| 1,936,372 | Waterman | Nov. 21, 1933 |
| 2,535,703 | Smith et al. | Dec. 26, 1950 |
| 2,762,454 | Sauer | Sept. 11, 1956 |